United States Patent
Maeng et al.

(10) Patent No.: US 10,379,643 B2
(45) Date of Patent: Aug. 13, 2019

(54) ELECTRODE STRUCTURE FOR TOUCH PANEL AND METHOD OF FABRICATING THE SAME

(71) Applicant: DONGWOO FINE-CHEM CO., LTD., Iksan-si, Jeollabuk-do (KR)

(72) Inventors: Changjun Maeng, Anseong-si (KR); Myunsoo Kim, Hwaseong-si (KR); In Ho Rha, Seongnam-si (KR); Woo Hyun Bae, Seongnam-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 15/322,819

(22) PCT Filed: Jun. 30, 2015

(86) PCT No.: PCT/KR2015/006703
§ 371 (c)(1),
(2) Date: Dec. 29, 2016

(87) PCT Pub. No.: WO2016/003160
PCT Pub. Date: Jan. 7, 2016

(65) Prior Publication Data
US 2017/0147099 A1    May 25, 2017

(30) Foreign Application Priority Data
Jul. 2, 2014 (KR) .................. 10-2014-0082390

(51) Int. Cl.
*G06F 3/041* (2006.01)
(52) U.S. Cl.
CPC .... *G06F 3/041* (2013.01); *G06F 2203/04103* (2013.01); *G06F 2203/04112* (2013.01)

(58) Field of Classification Search
CPC ...................................................... G06F 3/041
See application file for complete search history.

(56) References Cited

U.S. PATENT DOCUMENTS

| 9,921,698 B2* | 3/2018 | Ullmann | G06F 3/044 |
|---|---|---|---|
| 2011/0203654 A1* | 8/2011 | Kihara | B82Y 10/00 136/256 |
| 2012/0007812 A1 | 1/2012 | Hsu | |
| 2012/0056664 A1 | 3/2012 | Nam | |

(Continued)

FOREIGN PATENT DOCUMENTS

| CN | 102473046 A | 5/2012 |
|---|---|---|
| CN | 103336609 A | 10/2013 |

(Continued)

OTHER PUBLICATIONS

International Searching Authority, International Search Report for PCT/KR2015/006703 filed Oct. 20, 2015.

(Continued)

*Primary Examiner* — Vijay Shankar
*Assistant Examiner* — Cory A Almeida
(74) *Attorney, Agent, or Firm* — Sughrue Mion, PLLC (57) ABSTRACT

The present invention provides an electrode structure for a touch panel and a method for fabricating the same, in which a unit wire and another unit wire continued thereto are continued while the contact area between the unit wires decreases from the entire line width, thereby achieving irregular patterns. In the electrode structure for the touch panel and the method for fabricating the same, a metal wire formed with continuous unit wires has an irregular pattern where the contact area between any one unit wire and another unit wire continued thereto decreases, from the entire line width, by a non-contact size value k obtained by dividing a line width by an arbitrary real number.

10 Claims, 11 Drawing Sheets

(56) References Cited

U.S. PATENT DOCUMENTS

| | | | | |
|---|---|---|---|---|
| 2012/0118614 | A1* | 5/2012 | Kuriki | G06F 3/044 174/250 |
| 2012/0312677 | A1* | 12/2012 | Kuriki | G06F 3/044 200/600 |
| 2013/0069907 | A1 | 3/2013 | Hsu | |
| 2014/0225839 | A1* | 8/2014 | Dunphy | G06F 3/0412 345/173 |
| 2015/0029148 | A1* | 1/2015 | Wang | G06F 3/0412 345/174 |
| 2015/0169116 | A1* | 6/2015 | Masuda | G06F 3/044 345/174 |
| 2015/0212622 | A1* | 7/2015 | Hirata | G06F 3/044 345/174 |

FOREIGN PATENT DOCUMENTS

| | | |
|---|---|---|
| CN | 103426502 A | 12/2013 |
| JP | 3164915 U | 12/2010 |
| JP | 3179783 U | 10/2012 |
| KR | 10-0944519 B1 | 3/2010 |
| KR | 10-2010-0129230 A | 12/2010 |
| KR | 10-1301480 B1 | 8/2013 |
| KR | 10-2014-0003217 A | 1/2014 |
| KR | 10-2014-0030900 A | 3/2014 |
| TW | M379805 U1 | 5/2010 |
| WO | 2014/024683 A1 | 2/2014 |

OTHER PUBLICATIONS

The State Intellectual Property Office of People's Republic of China; Communication dated Dec. 21, 2018 in counterpart application No. 201580035626.9.

Taiwan Patent Office; Communication dated Dec. 19, 2018 in counterpart application No. 104121540.

* cited by examiner

When r=4
k=1/4Wm

ELECTRODE STRUCTURE FOR TOUCH PANEL AND METHOD OF FABRICATING THE SAME

CROSS REFERENCE TO RELATED APPLICATIONS

This application is a National Stage of International Application No. PCT/KR2015/006703 filed Jun. 30, 2015, claiming priority based on Korean Patent Application No. 10-2014-0082390 filed Jul. 2, 2014, the contents of all of which are incorporated herein by reference in their entirety.

TECHNICAL FIELD

The present invention relates to a touch panel, and more particularly, to an electrode structure for a touch panel and a method for fabricating the same, in which a unit wire and another unit wire continued thereto are continued while the contact area between the unit wires decreases from the entire line width, thereby achieving irregular patterns.

BACKGROUND ART

A touch panel, which is an input/output means for detecting a touch position of a user on a display screen and receiving information on the detected touch position to perform an overall control of an electronic device including a display screen control, is a device which recognizes touch as an input signal when an object such as a finger or a touch pen is touched on the screen.

The touch input device has been frequently mounted on a mobile device such as a mobile phone, a personal digital assistant (PDA), and a portable multimedia player (PMP) in recent years. In addition, the touch input device is used throughout overall industries, such as a navigation, a netbook, a notebook, a digital information device (DID), a desktop computer using an operating system that supports touch input, an internet protocol TV (IPTV), a state-of-the-art fighter, a tank, and an armored vehicle.

The touch panel is designed to be added on or embedded in a display device such as a liquid crystal display (LCD), a plasma display panel (PDP), an organic light emitting diode (OLED), or an active matrix organic light emitting diode (AMOLED).

The touch panel is optically transmissive and includes detecting units employing a conductive material.

The detecting units are formed in repetitive patterns in order to recognize the position of an input signal on the touch panel. In this case, there is a problem that as detecting layers including the detecting units are laminated in parallel, the patterns overlap each other and therefore a moire phenomenon occurs due to interference between the patterns.

There are proposed methods in which, when patterns constituting detecting electrodes overlap each other due to the stack of detecting substrates or the stack of the detecting substrate and an image display panel, torsion based on a predetermined angle is applied between the patterns to prevent the occurrence of a moire pattern, thereby solving a problem that visibility is deteriorated due to the moire pattern.

Korean Patent Application Publication No. 10-2010-0129230 has disclosed a method in which the sidewall formation of mesh patterns is controlled in a conductive layer constituting detecting units, thereby reducing the occurrence of moires.

In a process of forming the conductive layer, a photoresist material is proximity-exposed through a photomask disposed with a proximity gap of 70 to 200 μm, and periodic patterns corresponding to periodically repeated mask patterns of the photomask are formed.

First and second conductive thin metal wires constituting the conductive layer have protruding portions at sides thereof, and the protruding portions extend toward an opening from a virtual line indicating a designed width of the thin metal wire. The protruding amount of the protruding portion is $1/25$ to $1/6$ of the designed width.

In the prior art, the sidewall formation of the mesh patterns is controlled, thereby reducing the occurrence of moires. However, since the control of the forming position is done by the control of mask disposition, it is difficult to accurately control fine patterns of the protruding portion as the line width of the conductive layer decreases. Therefore, it is difficult to uniformly suppress the occurrence of the moire phenomenon over the entire region.

DISCLOSURE OF INVENTION

Technical Problem

An object of the present invention is to provide an electrode structure for a touch panel and a method for fabricating the same, in which a unit wire and another unit wire continued thereto are continued while the contact area between the unit wires decreases from the entire line width, thereby achieving irregular patterns.

Another object of the present invention is to provide an electrode structure for a touch panel and a method for fabricating the same, in which any one unit wire and another unit wire continued thereto are continued while changing the contact area between the unit wires to decrease from the entire line width by a non-contact size value k, which is obtained by dividing a line width by an arbitrary real number, thereby suppressing the occurrence of a moire phenomenon.

Still another object of the present invention is to provide an electrode structure for a touch panel and a method for fabricating the same, in which metal wires constituting detecting electrodes have irregular patterns in precisely controlled forms, so that it is possible to suppress the occurrence of a moire phenomenon, thereby improving the visibility of the panel.

The objects of the present invention are not limited to the aforementioned objects, and other objects thereof will be understandable by those skilled in the art from the following descriptions.

Technical Solution

According to an aspect of the present invention, there is provided an electrode structure for a touch panel, wherein a metal wire consisting of continuous unit wires has an irregular pattern where the contact area between any one unit wire and another unit wire continued thereto decreases, from the entire line width, by a non-contact size value k obtained by dividing a line width by an arbitrary real number.

Any one metal wire may repeatedly intersect other metal wires, thereby forming a mesh pattern.

The unit wire may be a regular square having a side length equal to a line width $W_m$ of the metal wire.

The non-contact size value k may be a non-contact element between the unit wires, which is obtained by dividing the line width $W_m$ of the metal wire by an arbitrary real number r ($k=W_m/r$).

The metal wire may be configured in the form where the disposition condition between any one unit wire and another unit wire continued thereto satisfies $k_{n+1}=k_n+k$ or $k_{n+1}=k_n-k$.

The continuous unit wires may have a form where the formation position of the next unit wire in the advancing direction of the metal wire moves from the left to the right by k ($k_{n+1}=k_n+k$) such that the contact area decreases by k from the entire line width.

The continuous unit wires may have a form where the formation position of the next unit wire in the advancing direction of the metal wire moves from the right to the left by k ($k_{n+1}=k_n-k$) such that the contact area decreases by k from the entire line width.

The continuous unit wires may have a form where one unit wire that the formation position of the next unit wire in the advancing direction of the metal wire moves from the left to the right ($k_{n+1}=k_n+k$) and another unit wire that the formation position of the next unit wire in the advancing direction of the metal wire moves from the right to the left ($k_{n+2}=k_{n+1}-k$) are alternated on a unit wire basis.

The continuous unit wires may have a form where the metal wire is divided into regions having a predetermined size such that the formation position of the next unit wire in the advancing direction of the metal wire moves from the left to the right ($k_{n+1}=k_n+k$) in one region and moves from the right to the left ($k_{n+1}=k_n-k$) in another region.

$$W_m \leq 3 \ \mu m,$$
$$0.1 < \frac{W_m - k}{W_m} \leq 1$$

may be applied when the line width $W_m$ is not more than 3 μm, and $$W_m > 3 \ \mu m,$$
$$0.2 < \frac{W_m - k}{W_m} \leq 0.8$$

may be applied when the line width $W_m$ is more than 3 μm such that the contact ratio of a unit wire and another unit wire of a metal wire consisting of continuous unit wires is changed based on when the line width of the metal wire is 3 μm. Here, $W_m$ is a line width of the metal wire, and k is a non-contact size value.

According to another aspect of the present invention, there is provided a method for fabricating an electrode structure for a touch panel, the method including: forming a metal layer on a substrate; and forming metal wires constituting a mesh pattern by patterning the metal layer using a photomask in which a mesh pattern is formed, wherein a metal wire consisting of continuous unit wires has an irregular pattern where the contact area between any one unit wire and another unit wire continued thereto decreases, from the entire line width, by a non-contact size value k obtained by dividing a line width by an arbitrary real number.

In the forming of the metal wires constituting the mesh pattern by patterning the metal layer, the metal layer may be patterned so that the continuous unit wires have a form where the formation position of the next unit wire in the advancing direction of the metal wire moves from the left to the right by k ($k_{n+1}=k_n+k$) such that the contact area decreases by k from the entire line width.

In the forming of the metal wires constituting the mesh pattern by patterning the metal layer, the metal layer may be patterned so that the continuous unit wires have a form where the formation position of the next unit wire in the advancing direction of the metal wire moves from the right to the left by k ($k_{n+1}=k_n-k$) such that the contact area decreases by k from the entire line width.

In the forming of the metal wires constituting the mesh pattern by patterning the metal layer, the metal layer may be patterned so that the continuous unit wires have a form where one unit wire that the formation position of the next unit wire in the advancing direction of the metal wire moves from the left to the right ($k_{n+1}=k_n+k$) and another unit wire that the formation position of the next unit wire in the advancing direction of the metal wire moves from the right to the left ($k_{n+2}=k_{n+1}-k$) are alternated on a unit wire basis.

In the forming of the metal wires constituting the mesh pattern by patterning the metal layer, the metal layer may be patterned so that the continuous unit wires have a form where the metal wire is divided into regions having a predetermined size such that the formation position of the next unit wire in the advancing direction of the metal wire moves from the left to the right ($k_{n+1}=k_n+k$) in one region and moves from the right to the left ($k_{n+1}=k_n-k$) in another region.

Advantageous Effects

The electrode structure for the touch panel and the method for fabricating the same according to the present invention have effects as follows.

First, it is possible to precisely control the formation of an irregular pattern in the form where the contact area between a unit wire and another unit wire continued thereto decreases from the entire line width and the unit wires are continued.

Second, the occurrence of a moire phenomenon is suppressed by the precisely controlled irregular pattern, thereby improving the visibility of the touch panel.

MODE FOR INVENTION

Hereinafter, preferred embodiments of an electrode structure for a touch panel and a method for fabricating the same according to the present invention will be described as follows.

Features and advantages of the electrode structure for the touch panel and the method for fabricating the same according to the present invention will be apparent through the following detailed descriptions of embodiments.

Figure 1:
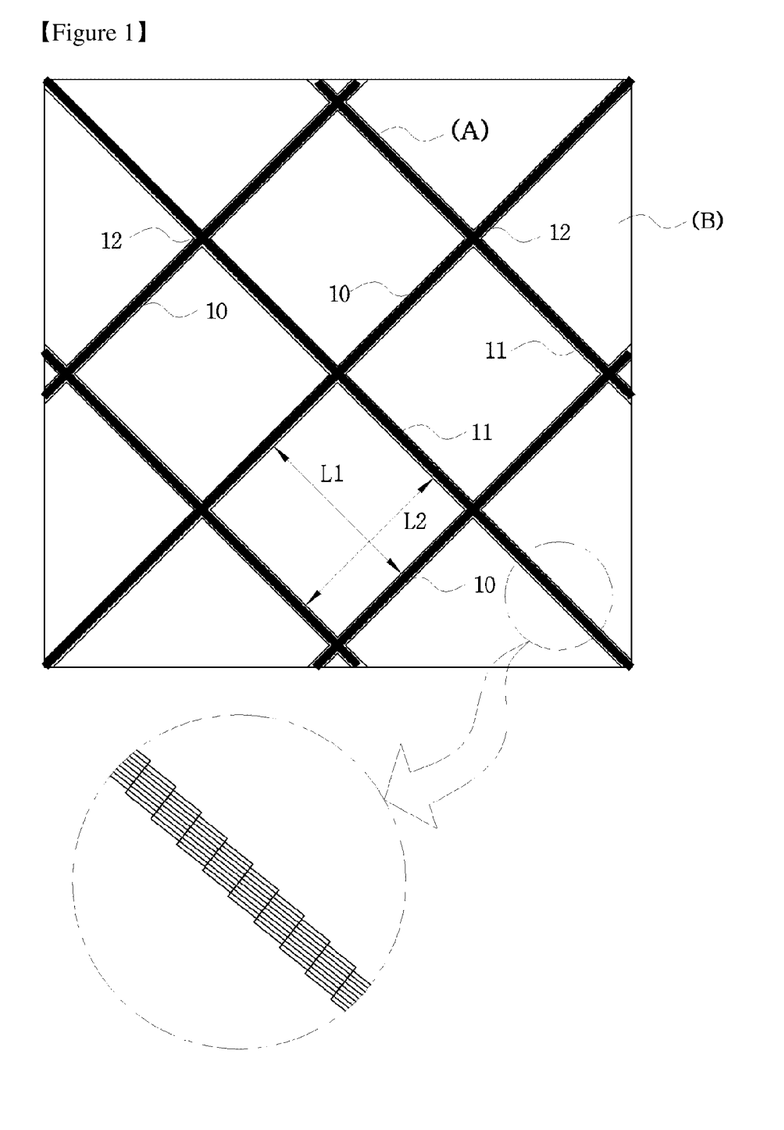
FIG. 1 is a configuration view showing an example of a touch panel to which an electrode structure according to the present invention is applied.
Figure 2:
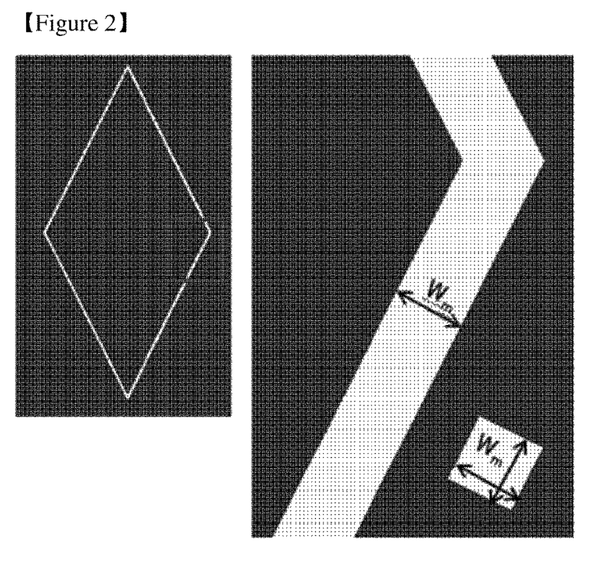
FIG. 2 is a configuration view of a metal wire and a unit wire according to the present invention.

FIG. 1 is a configuration view showing an example of a touch panel to which an electrode structure according to the present invention is applied. FIG. 2 is a configuration view of a metal wire and a unit wire according to the present invention.

In the present invention, a metal wire constituting a detecting unit of the touch panel is defined by continuous unit wires, and any one unit wire and another unit wire continued thereto are continued while changing the contact area between the unit wires to decrease, from the entire line width, by a non-contact size value k obtained by dividing a line width by an arbitrary real number, thereby achieving irregular patterns.

FIG. 1 shows one embodiment of the touch panel to which the electrode structure according to the present invention is applied. However, a structure on a layout, which constitutes the detecting unit, is not limited thereto.

The electrode structure according to the present invention includes a plurality of conductive regions A and openings B between conductive regions A continued to each other, and has a mesh form through coupling of the conductive regions A and the openings B.

The mesh form is a structure formed by one opening B and four conductive regions A surrounding the opening B.

The conductive regions A of the electrode structure according to the present invention include a plurality of first metal wires 10 arranged with a first pitch L1 in one direction and a plurality of second metal wires 11 arranged with a second pitch L2 in another direction. The plurality of first metal wires 10 and the plurality of second metal wires 11 intersect each other at intersection regions 12 to achieve a mesh pattern.

Here, the first metal wire 10 and the second metal wire 11 do not have a constant line width and a constant contact area, but have irregular patterns where the contact area between any one unit wire and another unit wire continued thereto decreases, from the entire line width, by a non-contact size value k obtained by dividing a line width by an arbitrary real number.

The irregular patterns are not limited to the form and direction shown in FIG. 1.

The first pitch L1 and the second pitch L2 may be of the same size or different sizes. Alternatively, the first pitch L1 and the second pitch L2 may be of a combination of the same size and different sizes.

FIG. 2 shows a configuration of a unit mesh and a unit wire according to the present invention. In this specification, any one of mesh patterns formed by intersecting metal wires and other metal wires is defined as a unit mesh, and a regular square having a side length equal to a line width $W_m$ of the metal wires constituting the unit mesh, is defined as a unit wire.

The metal wire is formed by allowing unit wires to be continued to each other, and a metal mesh is formed by connecting unit meshes to each other.

The non-contact size value k refers to a non-contact element between the unit wires, which is obtained by dividing the line width $W_m$ by an arbitrary real number r ($k=W_m/r$).

The metal wire is configured in the form where the disposition condition between adjacent unit wires satisfies $k_{n+1}=k_n+k$ or $k_{n+1}=k_n-k$.

Figure 3A:
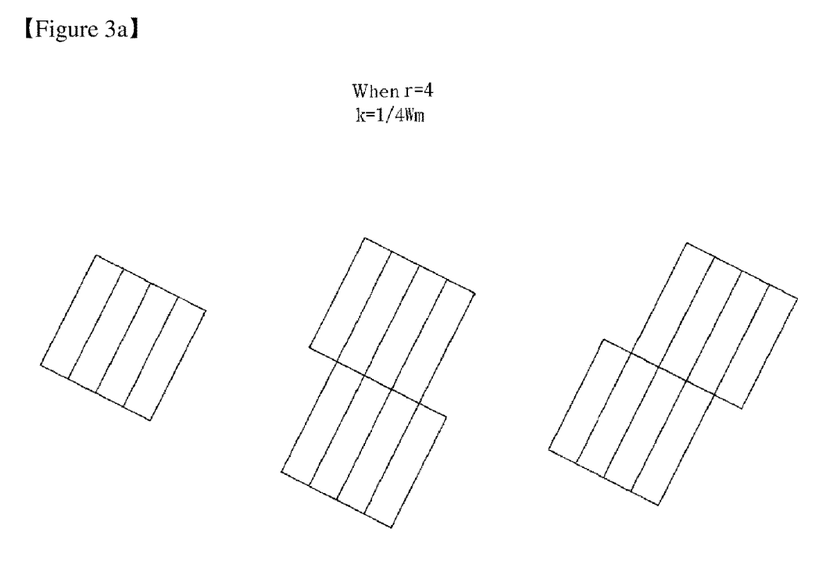
FIGS. 3a to 3c are configuration views showing irregular pattern structures of the metal wire according to the present invention.

FIG. 3a shows a case where the non-contact size value k is $\frac{1}{4}W_m$ when the arbitrary real number r is 4.

The contact area decreases (−k) or increases (+k) at the right in the advancing direction of a metal wire formed by allowing a unit wire and another unit wire adjacent thereto to be continued to each other.

Here, −k means that the formation position of the next unit wire in the advancing direction of the metal wire moves from the right to the left such that the contact area decreases by k from the entire line width and the unit wires are continued.

In addition, +k means that the formation position of the next unit wire in the advancing direction of the metal wire moves from the left to the right such that the contact area decreases by k from the entire line width and the unit wires are continued.

Figure 3B:
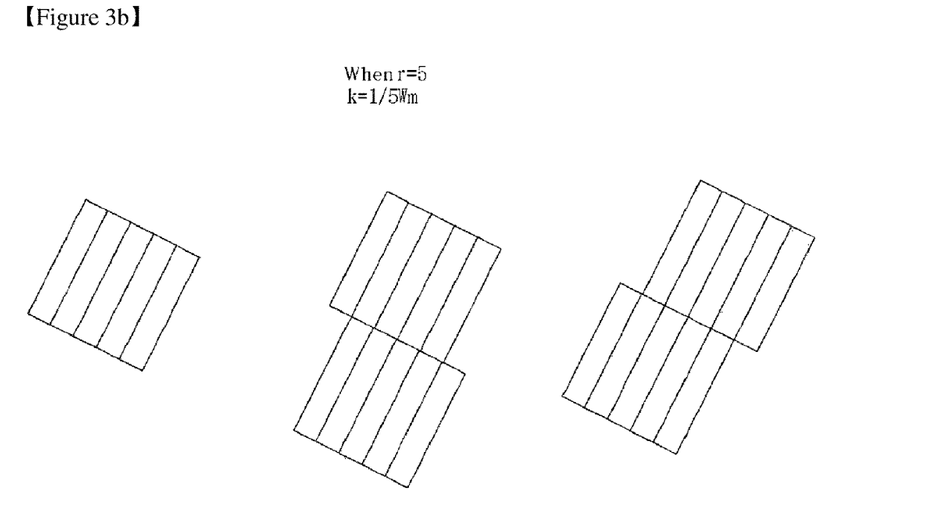

FIG. 3b shows a case where the non-contact size value k is $\frac{1}{5}W_m$ when the arbitrary real number r is 5.

Figure 3C:
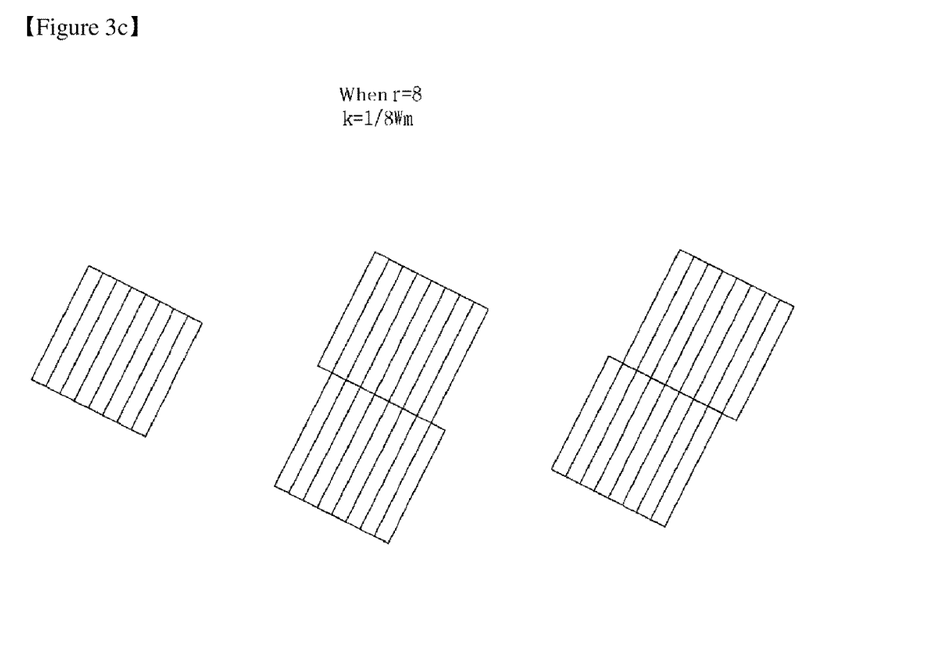

FIG. 3c shows a case where the non-contact size value k is $\frac{1}{8}W_m$ when the arbitrary real number r is 8.

FIGS. 4a to 4d are configuration views showing embodiments of irregular patterns of the electrode structure according to the present invention.

Figure 4A:
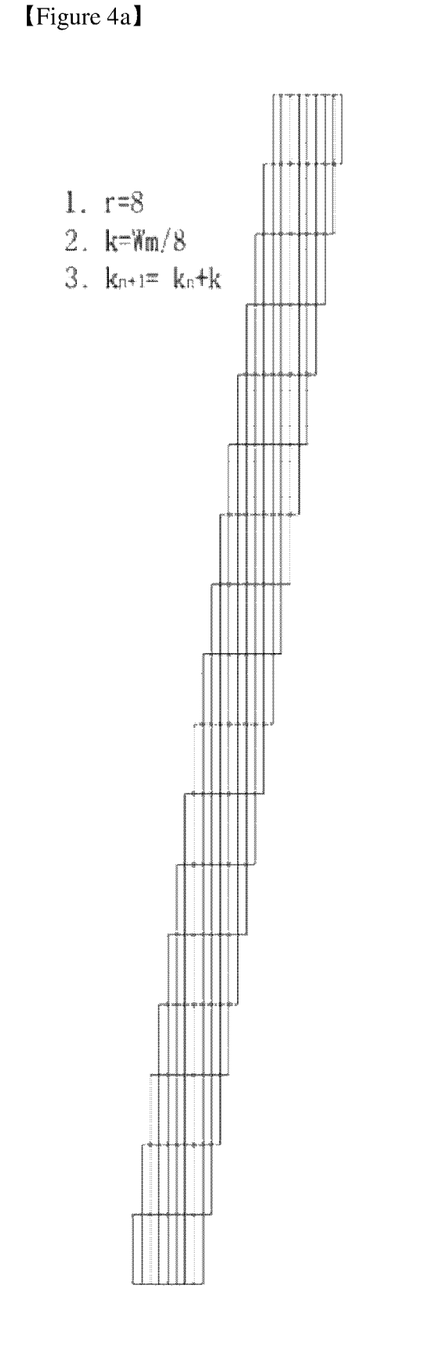
FIGS. 4a to 4d are configuration views showing embodiments of irregular patterns of the electrode structure according to the present invention.

FIG. 4a is a configuration view showing a state in which a metal wire constituting the electrode structure has a precisely controlled irregular pattern, which shows a case where the non-contact size value k is $\frac{1}{8}W_m$ when the arbitrary real number r is 8.

That is, FIG. 4a shows a form where the formation position of the next unit wire in the advancing direction of the metal wire moves from the left to the right ($k+i=k_n+k$) such that the contact area decreases by k from the entire line width and the unit wires are continued.

Figure 4B:
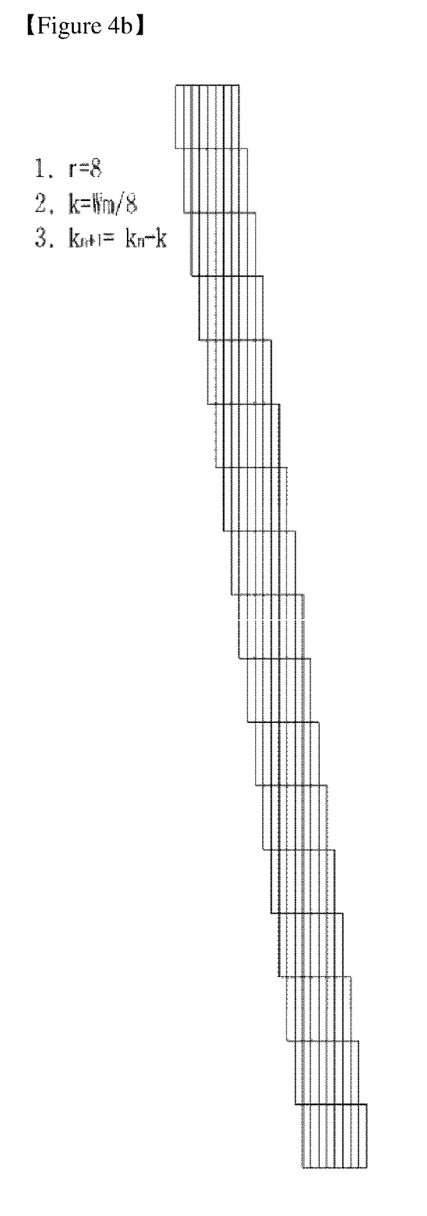

FIG. 4b shows a case where the non-contact size value k is $\frac{1}{8}W_m$ when the arbitrary real number r is 8. That is, FIG. 4b shows a form where the formation position of the next unit wire in the advancing direction of the metal wire moves from the right to the left ($k_{n+1}=k_n-k$) such that the contact area decreases by k from the entire line width and the unit wires are continued.

Figure 4C:
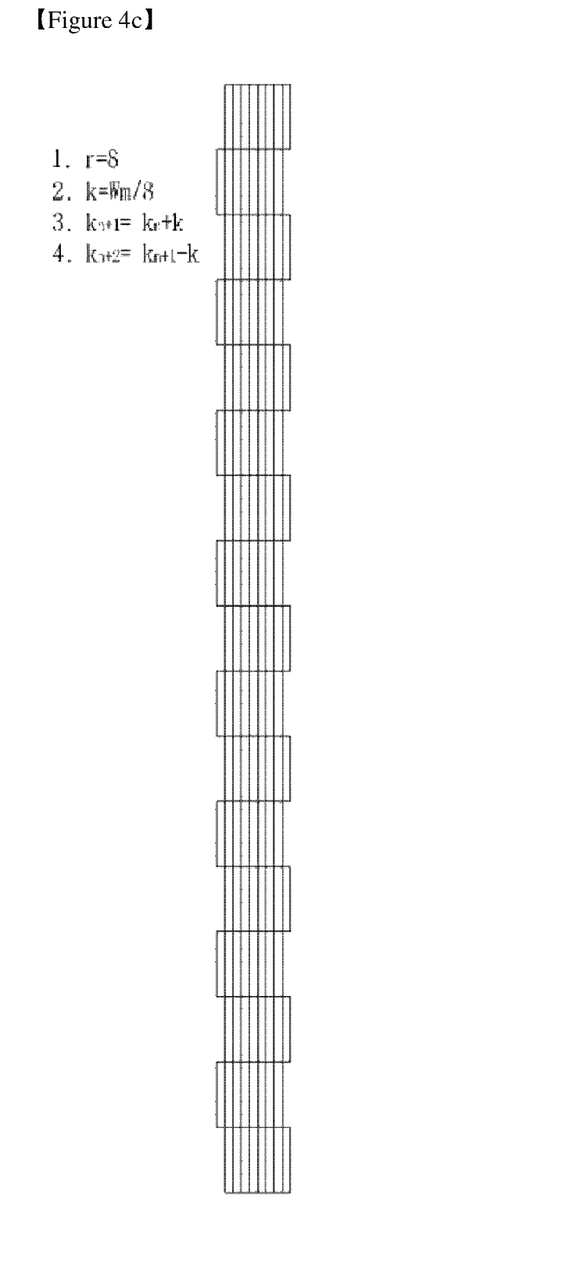

FIG. 4c shows a case where the non-contact size value k is $\frac{1}{8}Wm$ when the arbitrary real number r is 8. That is, FIG. 4c shows a form where a unit wire that the formation position of the next unit wire in the advancing direction of the metal wire moves from the left to the right ($k_{n+1}=k_n+k$) and another unit wire that the formation position of the next unit wire in the advancing direction of the metal wire moves from the right to the left ($k_{n+2}=k_{n+1}-k$) are alternated on a unit wire basis.

Figure 4D:
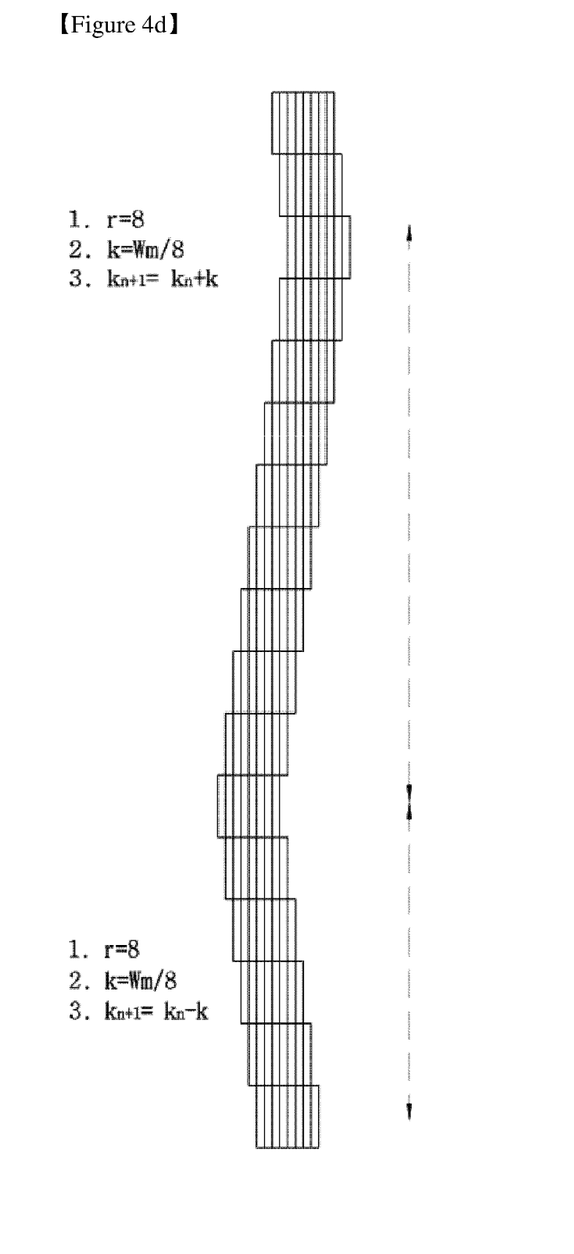

FIG. 4d shows a case where the non-contact size value k is $\frac{1}{8}W_m$ when the arbitrary real number r is 8. That is, FIG. 4d shows a form where the metal wire is divided by a predetermined length such that the formation position of the next unit wire in the advancing direction of the metal wire moves from the left to the right ($k_n+t=k_n+k$) in one region and moves from the right to the left ($k_{n+1}=k_n-k$) in another region.

The form of the metal wire of the electrode structure according to the present invention is not limited to the forms in FIGS. 4a to 4d and may be modified and embodied in other forms.

A method of fabricating the electrode structure for the touch panel according to the present invention is as follows.

Figure 5A:
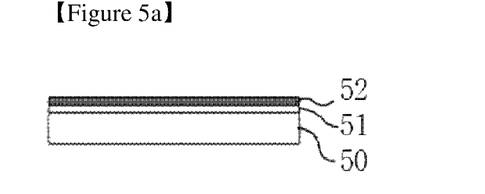
FIGS. 5a to 5v are sectional views of a process for fabricating the electrode structure according to the present invention.
Figure 5B:
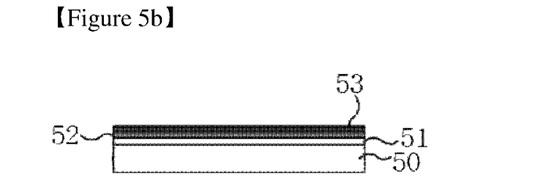
Figure 5C:
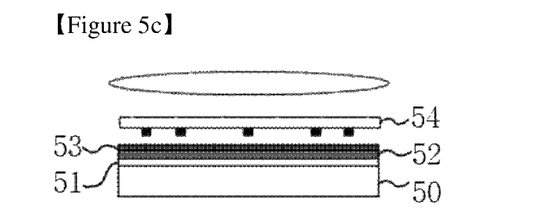
Figure 5D:
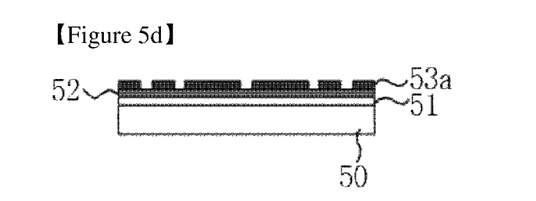
Figure 5E:
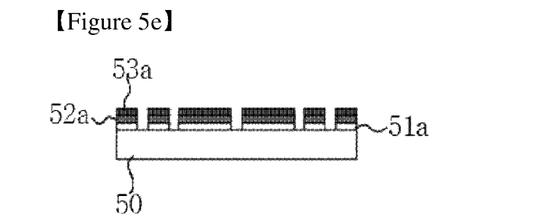
Figure 5F:
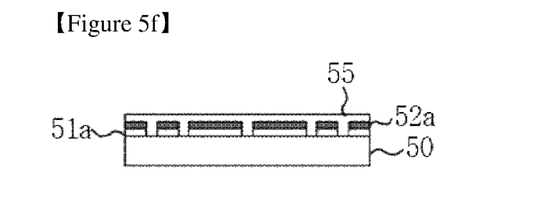
Figure 5G:
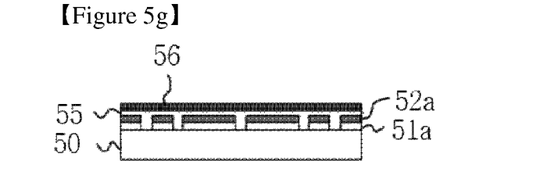
Figure 5H:
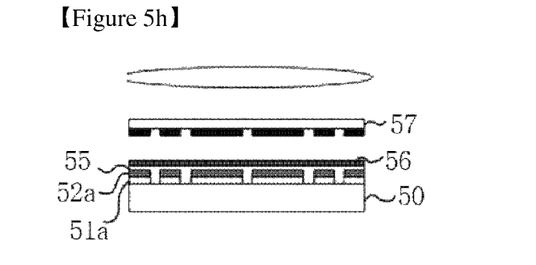
Figure 5I:
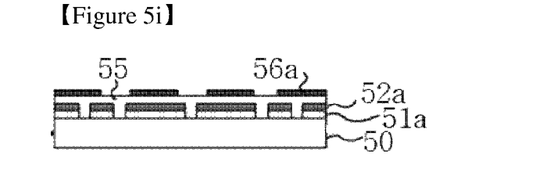
Figure 5J:
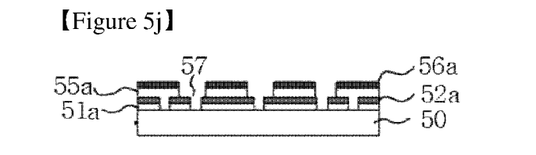
Figure 5K:
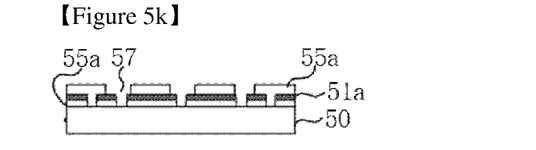
Figure 5L:
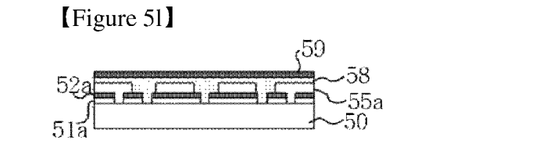
Figure 5M:
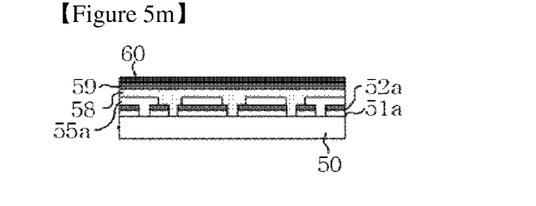
Figure 5N:
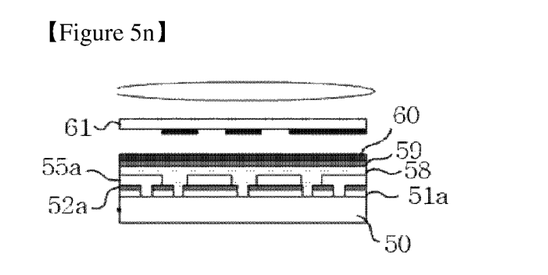
Figure 5O:
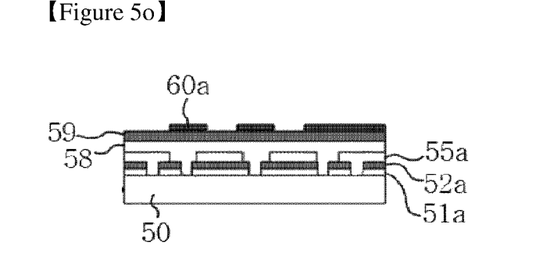
Figure 5P:
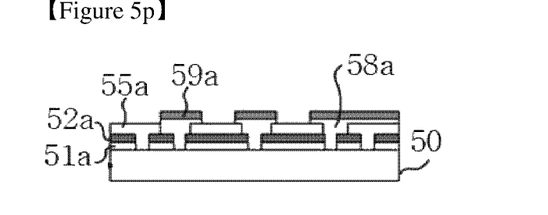
Figure 5Q:
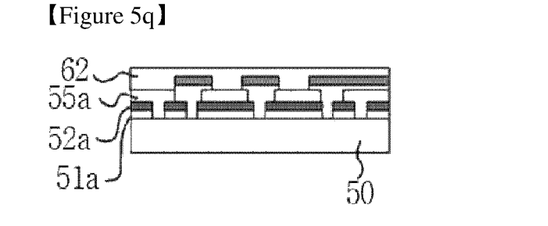
Figure 5R:
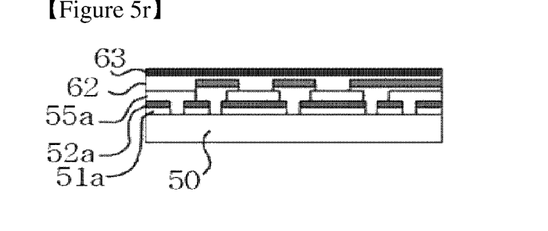
Figure 5S:
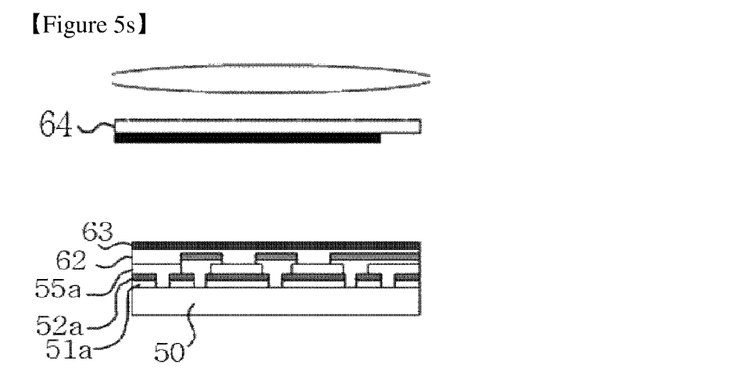
Figure 5T:
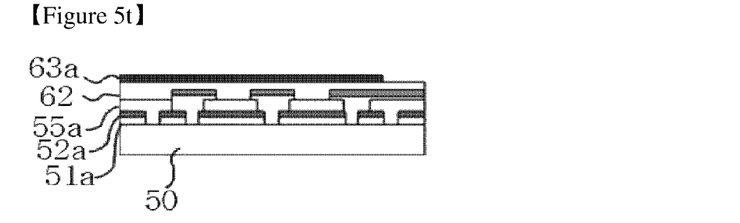
Figure 5U:
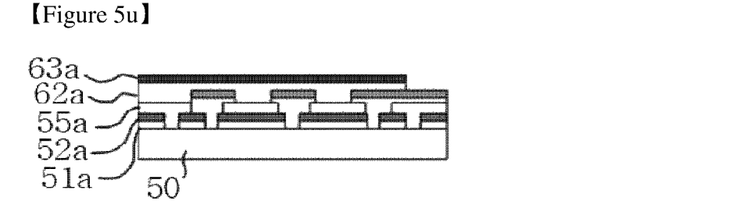
Figure 5V:
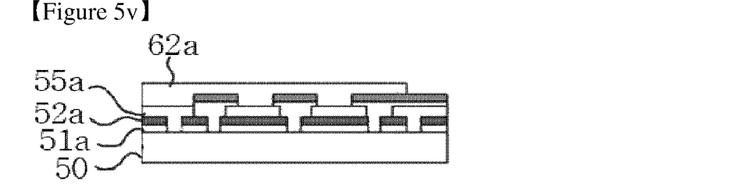

FIGS. 5a to 5v are sectional views of a process for fabricating the electrode structure according to the present invention.

The fabricating process in the following description shows an example of a process to which the electrode structure according to the present invention is applied. The process of the present invention is not limited to the structures and process conditions described below, and may be variously formed.

First, as shown in FIG. 5a, a first oxide layer 51 and a first metal layer 52 are formed on a transparent substrate 50.

The first oxide layer 51 may include indium tin oxide (ITO) and indium zinc oxide (IZO). The first metal layer 52 may include a Mo and Ag alloy, an Al alloy, and the like.

Thereafter, a photoresist 53 is applied on the first metal layer 52 as shown in FIG. 5b, and then exposed using a photomask 54 in which a mesh pattern is formed as shown in FIG. 5c.

Subsequently, as shown in FIG. 5d, a photoresist pattern layer 53a is formed by developing the photoresist 53. As shown in FIG. 5e, the first metal layer 52 and the first oxide layer 51 are selectively patterned with a wet etching liquid by using the photoresist pattern layer 53a, thereby forming a first oxide layer pattern 51a and a first metal pattern 52a Here, the first metal pattern 52a becomes a metal wire in any one direction, which constitutes the detecting unit. The first metal pattern 52a may be patterned in the forms shown in FIGS. 4a to 4d.

That is, a metal wire consisting of continuous unit wires has an irregular pattern where the contact area between any one unit wire and another unit wire continued thereto decreases, from the entire line width, by a non-contact size value k obtained by dividing a line width by an arbitrary real number.

Thereafter, as shown in FIG. 5f, the photoresist pattern layer 53a is removed and an insulating layer (SiON) 55 is formed on the first metal pattern 52a.

Subsequently, a photoresist (PR) 56 is applied on the insulating layer 55 as shown in FIG. 5g. The photoresist 56 is then exposed using a photomask 57 in which a hole pattern is formed as shown in FIG. 5h, thereby forming a photoresist pattern layer 56a as shown in FIG. 5i.

Thereafter, as shown in FIG. 5j, the insulating layer 55 is selectively removed through a dry etching process using the photoresist pattern layer 56a, thereby forming a connection hole 57. As shown in FIG. 5k, the photoresist pattern layer 56a is removed.

Subsequently, as shown in FIG. 5l, a second oxide layer 58 and a second metal layer 59 are formed on an insulating layer pattern 55a in which the connection hole 57 is formed.

Thereafter, as shown in FIG. 5m, a photoresist 60 is applied on the second metal layer 59. As shown in FIG. 5n, the photoresist 60 is exposed using a photomask 61 in which a mesh bridge pattern is formed.

Subsequently, as shown in FIG. 5o, a photoresist pattern layer 60a is formed by developing the photoresist 60. As shown in FIG. 5p, the second metal layer 59 and the second oxide layer 58 are selectively patterned with a wet etching liquid by using the photoresist pattern layer 60a, thereby forming a second oxide layer pattern 58a and a mesh bridge pattern 59a.

Thereafter, as shown in FIGS. 5q to 5v, an inorganic or organic insulating layer 62 is formed on the mesh bridge pattern 59a, and a photoresist pattern layer 63a and an inorganic or organic insulating layer pattern layer 62a are formed by performing application of a photoresist 63 and exposure and development using a photomask 64, thereby fabricating a substrate on which detecting electrodes and driving electrodes are formed.

The above-described electrode structure for the touch panel according to the present invention has moire suppression characteristics as follows.

TABLE 1

| | Line Width of Unit Wire ($W_m$) | $\dfrac{W_m - k}{W_m}$ | Increase in Resistance (%) | Pattern Formation Degree | Moire Characteristic |
|---|---|---|---|---|---|
| Comparative Example 1 | 1 | 0.1 | 227.1 | C | B |
| Example 1 | 1 | 0.45 | 52.3 | B | A |
| Example 2 | 1 | 0.6 | 29.5 | B | A |
| Example 3 | 1 | 0.9 | less than 10% | C | B |
| Comparative Example 2 | 2 | 0.1 | 183.5 | C | B |
| Example 4 | 2 | 0.25 | 99.7 | B | B |
| Example 5 | 2 | 0.45 | 50.7 | B | A |
| Example 6 | 2 | 0.5 | 41.5 | A | A |
| Example 7 | 2 | 0.75 | 10.7 | A | A |
| Example 8 | 2 | 0.9 | less than 10% | C | B |
| Example 9 | 3 | 0.3 | 93.6 | B | B |
| Example 10 | 3 | 0.45 | 48.9 | A | A |
| Example 11 | 3 | 0.5 | 41.2 | A | A |
| Example 12 | 3 | 0.8 | less than 10% | B | B |

TABLE 2

| | Line Width of Unit Wire ($W_m$) | $\dfrac{W_m - k}{W_m}$ | Increase in Resistance (%) | Pattern Formation Degree | Moire Characteristic |
|---|---|---|---|---|---|
| Comparative Example 3 | 4 | 0.1 | 140.3 | C | C |
| Example 13 | 4 | 0.2 | 97.8 | B | C |
| Example 14 | 4 | 0.45 | 46.1 | A | B |
| Example 15 | 4 | 0.5 | 40.7 | A | B |
| Example 16 | 4 | 0.6 | 22.1 | A | B |
| Example 17 | 4 | 0.8 | less than 10% | B | C |
| Comparative Example 4 | 4 | 0.9 | less than 10% | C | C |
| Comparative Example 5 | 5 | 0.1 | 121.2 | B | C |
| Example 18 | 5 | 0.2 | 96.4 | B | C |
| Example 19 | 5 | 0.26 | 81.6 | B | B |
| Example 20 | 5 | 0.5 | 40.3 | A | B |
| Example 21 | 5 | 0.6 | 20.3 | A | B |
| Example 22 | 5 | 0.75 | less than 10% | A | B |
| Comparative Example 6 | 5 | 0.9 | less than 10% | B | C |

Table 1 shows cases where the line width $W_m$ is 1 to 3 μm, and Table 2 shows cases where the line width $W_m$ is 4 to 5 m.

In the examples, patterns which satisfy $k_{n+1}=k_n+k/k_{n+2}=k_{n+1}-k$ are formed, and then increases in resistance as compared with a straight line, pattern formation precision degrees and moire characteristics are compared.

In the pattern formation degrees, a case where the pattern formation degree is less than 30% as compared with a designed value is evaluated as A, a case where the pattern formation degree is not less than 30% and less than 70% is evaluated as B, and a case where the pattern formation degree is not less than 70% is evaluated as C.

In the moire characteristics, the occurrence of a moire phenomenon caused by rotation of patterns is observed for each line width and each contact area. A case where the moire phenomenon is never found is evaluated as A, a case where the moire phenomenon is vague is evaluated as B, or a case where the moire phenomenon is definite is evaluated as C.

In a contact ratio of 0.9 or more, the patterns are shown as straight linear metal wires, and the moire characteristic is evaluated as C or less.

In addition, the patterns preferably have different reference contact ratios based on a line width of 3 µm by considering the characteristic of increase in resistance as compared with a straight linear metal wire.

$$W_m \leq 3 \ \mu m, \quad 0.1 < \frac{W_m - k}{W_m} \leq 1 \quad \text{Expression 1}$$

$$W_m > 3 \ \mu m, \quad 0.2 < \frac{W_m - k}{W_m} \leq 0.8 \quad \text{Expression 2}$$

Expression 1 becomes a reference applied when the line width $W_m$ is not more than 3 µm, and Expression 2 becomes a reference applied when the line width $W_m$ is more than 3 µm.

In the electrode structure for the touch panel and the method for fabricating the same according to the present invention, any one unit wire and another unit wire continued thereto are continued while changing the contact area between the unit wires to decrease, from the entire line width, by a non-contact size value k obtained by dividing a line width by an arbitrary real number, so that it is possible to suppress the occurrence of a moire phenomenon, thereby improving the visibility of the panel.

Although the present invention has been described in connection with the preferred embodiments, the embodiments of the present invention are only for illustrative purposes and should not be construed as limiting the scope of the present invention. It will be understood by those skilled in the art that various changes and modifications can be made thereto within the technical spirit and scope defined by the appended claims.

EXPLANATION OF REFERENCE NUMERALS

10. First Metal Wire
11. Second Metal Wire
12. Intersection Region

The invention claimed is:

1. An electrode structure for a touch panel, wherein the electrode structure comprises a metal wire having an irregular pattern,
    wherein the metal wire consists of continuous unit wires, wherein respective unit wires have a length L and a width $W_m$ and have a first contact portion and a second contact portion that is opposite to the first contact portion, and wherein respective unit wires are in partial contact with their adjacent unit wires at the first contact portion and at the second contact portion, respectively, in lengthwise direction to form the continuous unit wires,
    wherein the continuous unit wires comprise a first unit wire, and a second unit wire of which the first contact portion is in partial contact with the second contact portion of the first unit wire,
    wherein an amount of the partial contact between the first contact portion of the second unit wire and the second contact portion of the first unit wire is $W_m - k$, wherein $k = W_m / r$, wherein the k is consistent throughout the continuous unit wires; and
    wherein when $W_m \leq 3$ µm: $1.33 \leq r \leq 5$ and $0.25 \leq (W_m - k)/W_m \leq 0.8$ are satisfied, and
    when $W_m > 3$ µm: $1.35 \leq r \leq 4$ and $0.26 \leq (W_m - k)/W_m \leq 0.75$ are satisfied.

2. The electrode structure of claim 1, wherein the metal wire repeatedly intersects another metal wires, thereby forming a mesh pattern.

3. The electrode structure of claim 1, wherein the respective unit wires are a regular square having a side length equal to the width $W_m$ of the metal wire.

4. The electrode structure of claim 1, wherein the continuous unit wires further comprise a third unit wire of which first contact portion is in partial contact with the second contact portion of the second unit wire, wherein the partial contact between the third unit wire and the second unit wire exist in a side opposite from the partial contact between the first unit wire and the second unit wire so as to form a zig-zag configuration of the continuous unit wires.

5. The electrode structure of claim 1, wherein the continuous unit wires further comprise a third unit wire of which first contact portion is in partial contact with the second contact portion of the second unit wire, wherein the partial contact between the third unit wire and the second unit wire exist in a same side as the partial contact between the first unit wire and the second unit wire so as to form a tilted line configuration of the continuous unit wires.

6. The electrode structure of claim 1, wherein the continuous unit wires comprises a first region and a second region, and
    in the first region, the continuous unit wires further comprise a third unit wire of which first contact portion is in partial contact with the second contact portion of the second unit wire, wherein the partial contact between the third unit wire and the second unit wire exist in a same side as the partial contact between the first unit wire and the second unit wire so as to form one tilted line configuration of the continuous unit wires, and
    in the second region, the continuous unit wires comprise another tilted line configuration opposite from the one tilted line configuration in the first region.

7. A method for fabricating an electrode structure for a touch panel, the method comprising:
    forming a metal layer on a substrate; and
    forming metal wires constituting a mesh pattern by patterning the metal layer using a photomask in which a mesh pattern is formed,
    wherein a metal wire consisting of continuous unit wires has an irregular pattern, wherein respective unit wires have a length L and a width $W_m$ and are in contact with their adjacent unit wires in lengthwise direction to form the continuous unit wires,
    wherein the continuous unit wires comprise a first unit wire, and a second unit wire of which the first contact portion is in partial contact with the second contact portion of the first unit wire,
    wherein an amount of the partial contact between the first contact portion of the second unit wire and the second contact portion of the first unit wire is $W_m - k$, wherein $k = W_m / r$, wherein the k is consistent throughout the continuous unit wires; and wherein when $W_m \leq 3$ µm: $1.33 \leq r \leq 5$ and $0.25 \leq (W_m-k)/W_m \leq 0.8$ are satisfied, and when $W_m > 3$ µm: $1.35 \leq r \leq 4$ and $0.26 \leq (W_m-k)/W_m \leq 0.75$ are satisfied.

8. The method of claim 7, wherein, in the forming of the metal wires constituting the mesh pattern by patterning the metal layer, the metal layer is patterned so that the continuous unit wires further comprise a third unit wire of which first contact portion is in partial contact with the second contact portion of the second unit wire, wherein the partial contact between the third unit wire and the second unit wire exist in a side opposite from the partial contact between the first unit wire and the second unit wire so as to form a zig-zag configuration of the continuous unit wires.

9. The method of claim 7, wherein, in the forming of the metal wires constituting the mesh pattern by patterning the metal layer, the metal layer is patterned so that the continuous unit wires further comprise a third unit wire of which first contact portion is in partial contact with the second contact portion of the second unit wire, wherein the partial contact between the third unit wire and the second unit wire exist in a same side as the partial contact between the first unit wire and the second unit wire so as to form a tilted line configuration of the continuous unit wires.

10. The method of claim 7, wherein, in the forming of the metal wires constituting the mesh pattern by patterning the metal layer, the metal layer is patterned so that the continuous unit wires comprise a first region and a second region, and in the first region, the continuous unit wires further comprise a third unit wire of which first contact portion is in partial contact with the second contact portion of the second unit wire, wherein the partial contact between the third unit wire and the second unit wire exist in a same side as the partial contact between the first unit wire and the second unit wire so as to form one tilted line configuration of the continuous unit wires, in the second region, the continuous unit wires comprise another tilted line configuration opposite from the one tilted line configuration in the first region.

\* \* \* \* \*